United States Patent [19]

Gargrave

[11] 4,334,714

[45] Jun. 15, 1982

[54] KEY TYPE CONNECTOR AND BEARING DEVICE

[76] Inventor: Robert J. Gargrave, 4717 James Hill Rd., Dayton, Ohio 45429

[21] Appl. No.: 145,124

[22] Filed: Apr. 30, 1980

[51] Int. Cl.³ .............................................. F16C 33/00
[52] U.S. Cl. ................................ 308/3 R; 308/237 R; 308/239; 403/367; 403/369; 403/409
[58] Field of Search .......... 308/3 A, 3 R, 4 C, 237 R, 308/238, 239; 138/108, 113, 114; 403/367, 368, 369, 372, 409; 301/111; 428/382, 383

[56] References Cited

U.S. PATENT DOCUMENTS

| 294,629 | 3/1884 | Jenkins | 403/369 X |
| 3,105,723 | 10/1963 | Hamaker | 308/3 R |
| 3,401,280 | 9/1968 | Lackey et al. | 428/582 X |

FOREIGN PATENT DOCUMENTS 2224437  12/1973  Fed. Rep. of Germany ...... 403/368

Primary Examiner—James E. Bryant, III
Attorney, Agent, or Firm—Jerome P. Bloom

[57] ABSTRACT

A plate-like element for insertion in a bore or recess to provide a fixing or bearing surface for a shaft or a shaft-like portion of an element includes a laterally centered section having the configuration of a short longitudinally oriented section of a cylindrical wall structure. This laterally centered section, which is correspondingly bowed, has wing-like plate portions at its remote lateral extremities which are co-planar. The remote lateral extremities of the wing-like portions are thinned at their leading edges, having regard for the direction of application of the plate-like element in use. The bowed portion is distinguished at its outer convex surface by an elongated, laterally centered, projection having essentially parallel sides the outermost surface portion of which is flatly arcuate in transverse cross-section and the leading end of which is also arcuate in configuration. What may be considered the leading end of the projection is spaced rearwardly from the leading edge of the plate element, also to facilitate application of the plate. A preferred embodiment of the plate element has an anchoring device centered on and projected from its leading edge. Also, its trailing edge may be provided with an integrated breakaway handle which facilitates its insertion in a bore or a recess.

17 Claims, 8 Drawing Figures

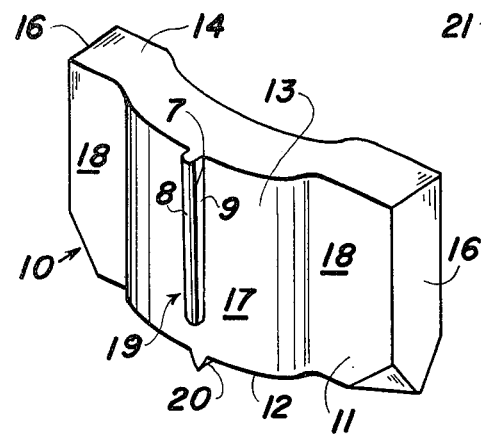
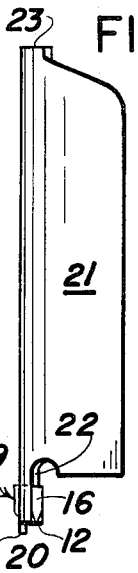
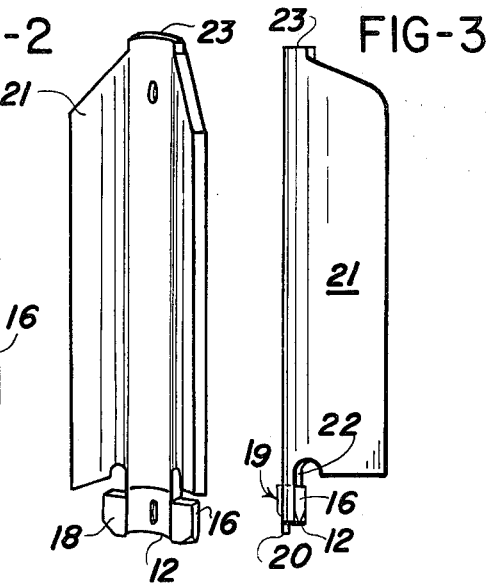
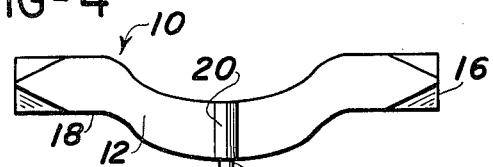
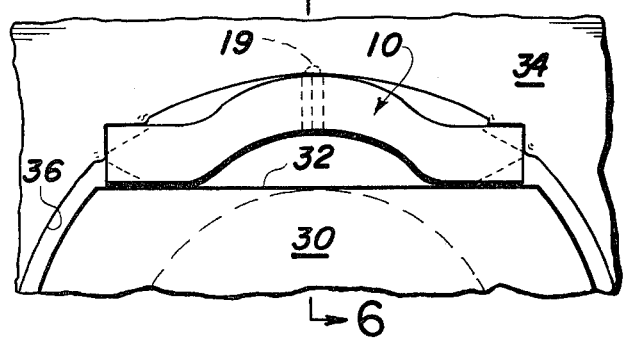
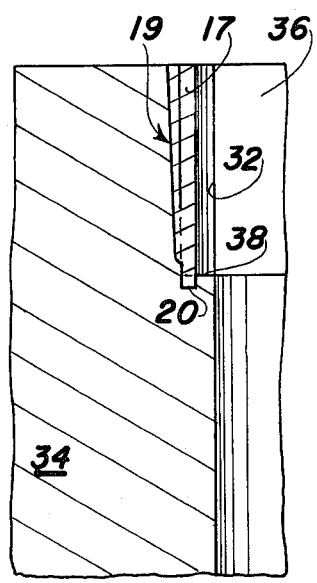
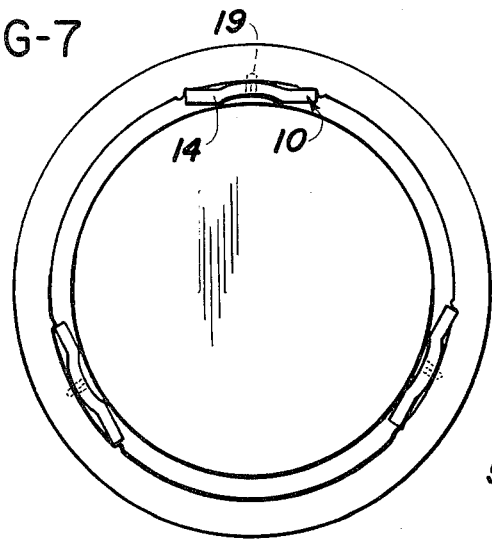
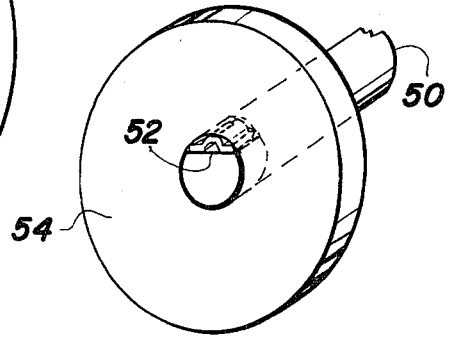

KEY TYPE CONNECTOR AND BEARING DEVICE

BACKGROUND OF THE INVENTION

This invention relates to a new and simplified device for insertion in a bore or recess to fix therein or provide a bearing surface for a shaft or a shaft-like portion of an element. It provides an improved and more economical species of key device of the type disclosed in the present inventor's co-pending application for U.S. Ser. No. 815,558, filed July 14, 1977 for "CONNECTOR AND BEARING DEVICE", now U.S. Pat. No. 4,214,739, dated July 29, 1980 which, in the opinion of the present inventor, exhibits the most pertinent prior art.

The embodiments of the present invention provide minimal requirements as to material and anchor portions, facilitating their application for the purpose intended and lending economy to and greater ease and facility of application of such devices. Though embodying a minimal of anchoring portions, their most stable application and the maintenance of their position in use is insured.

SUMMARY OF THE INVENTION

A preferred embodiment of the present invention comprises a thin plate element including an inner surface portion, an outer surface portion and leading and trailing edges having regard for the direction of its insertion in a bore or recess. Its length is shorter than its width. The laterally centered portion of the plate element is transversely bowed and its configuration resembles that of a longitudinally oriented section of a short cylindrical wall structure. This bowed section is laterally extended to form a wing-like plate segment thereon at each of its opposite sides. These wing-like segments are co-planar. The remote lateral extremities of the leading edges of the co-planar segments are cut back by a removal of a tapered triangular portion of their thickness at each of their inner and outer faces to provide that they are thinned at their leading edges and taper in thickness gently to the lateral extremities of their leading edge.

The bowed section has a laterally centered anchor projection on its transversely convex outermost surface, spaced from its leading edge. In a preferred embodiment, projected axially from the plate and perpendicular to its leading edge is a second projection, adapted also to serve as an anchor means.

As will be seen, this thin plate may be driven into a sidewall portion of a bore or recess from one end thereof, very easily, by reason of the form of the corners of its leading edge. Where the plate element embodies a laterally centered anchor means projecting from its leading edge, this may be anchored to a shoulder formed in the wall surface of the bore or recess to which the plate is applied, where such is provided. At the same time, the projection on the convex outer surface of its bowed portion, which lines up with the anchoring means at its leading edge, will smoothly force its way into the bore or recess wall as the plate is inserted, giving the plate an axial as well as a longitudinal fix when the insertion is complete.

A primary object of the invention is to provide a key type fixing or bearing device which is simpler and more economical to fabricate, efficient and satisfactory in use, applicable to a wide variety of applications and unlikely to malfunction.

Another object is to provide such a key device the alignment of which in application is controlled by a single projection generally perpendicular to the outer surface of its plate form, adjacent its leading edge.

A further object is to provide such a plate type key device the application of which is facilitated by a variation of its thickness in areas limited to the remote corners of its leading edge.

An additional object of the invention is to provide such a key device possessing the advantageous structural features, the inherent meritorious characteristics and means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is an enlarged perspective view of the key device according to the present invention viewing, primarily, its outer surface portion;

FIG. 2 shows a modification of the device of FIG. 1 incorporating a break-away handle, viewing its inner surface portion;

FIG. 3 is a side view of the device of FIG. 2;

FIG. 4 is a view of the leading edge of the devices of FIG. 1 and FIG. 2;

FIG. 5 is a fragmentary end view of a tool such as a punch or forming tool applied to its retainer and fixed in position by the embodiment therewith of the device of FIG. 1;

FIG. 6 is a sectional view taken on line 6—6 of FIG. 5;

FIG. 7 is a view showing the use of the device of FIG. 1 as a bearing component for the axle of a wheel; and FIG. 8 is an exploded fragmentary view illustrating how the device of the invention may be used to fix an end of a shaft having a flat thereon in the bore of a wheellike object.

Like parts are indicated by similar characters of reference throughout the several views.

DESCRIPTION OF THE PREFERRED EMBODIMENT OF THE INVENTION ILLUSTRATED

The embodiment illustrated comprises a plate-like element 10, fabricated preferably as a metal stamping. Having regard for the direction of its application, the element 10 may be described as having a leading end 11 including a leading edge 12, a trailing end 13 including a trailing edge 14, and lateral edge portions 16. The leading and trailing edges 12 and 14 are substantially parallel and oriented to be substantially perpendicular to the lateral edge portions 16, which are also substantially parallel.

A section 17 of the plate element 10 which is centered between and spaced equidistantly from the lateral edge portions 16 has a configuration to resemble that of a short longitudinally extended section of a cylindrical wall structure. The section 17 is correspondingly bowed in a transverse sense. As shown, this bow is flatly arcuate. As so provided, the section 17 is flanked and extended at its lateral extremities by plate segments 18 the remote extremities of which define the lateral edges 16.

The segments 18 are co-planar and each of the remote extremities of their leading edges, at each of their opposite faces, are cut back by the removal of a triangular portion of their thickness, to provide that a substantial extent of their leading end portions are thinned. Their leading end portions, as so provided, are tapered in thickness, divergently, to the corners of the leading edge of the plate element to have a maximum reduction of their thickness at their remote extremities.

The bowed portion 17 has in transversely centered relation to its outer convex surface a bulge defining a projection 19. The projection 19 has an elongate line form and extends rearwardly from a point adjacent but spaced from the leading edge 12, along the length of the section 17.

The depth of the projection 19 varies from one end thereof to the other in a gradual fashion. Its depth is greatest at the trailing edge 14 of the plate 10 and smoothly reduces to a minimum as it extends toward the leading edge 12. The configuration so provided puts a taper on the profile of the projection at its outermost surface.

The length of the projection 19 is thus less than that of the plate 10 and it is offset from its leading edge. The longitudinal shallow sides 9 of the projection 19 are essentially parallel and slightly projected from the convex surface of the portion 17, to either side of its apex. At their outer limits these sides are bridged by the outermost surface portion of the projection 19, which is flatly arcuate in cross section. The lines of joinder 7 of the sides 9 with surface 8 are relatively sharp and parallel.

The longitudinal extent of the plate 10 is less than its lateral extent. Not only is the projection 19 provided with an outer surface which is flatly arcuate in transverse section but its leading end is arcuately rounded also.

Fixed and projected in a sense perpendicular to and from the edge 12 of the plate 10, and axially of the plate 10, is a triangularly configured projection 20 the apex point of which is outermost. The position of the projection 20 centers it with reference to the transverse arc of the leading edge portion of the plate section 17, which extends the length of the plate 10.

Viewing FIGS. 2 and 3, in a stamping of the platelike element 10 from sheet metal a break-away handle portion 21 may be formed integral with and to project perpendicular to its trailing edge 14. As shown, handle 21 is in line with the section 17 and connected thereto by a necked portion 22. The portion 22 is transversely arcuate in cross section, essentially providing an axial extension of the trailing end of the section 17. The neck portion 22 tapers and narrows as it extends axially from the element 10 and then expands as it joins to the adjacent end of the handle 21, which in the example illustrated is laterally extended but also transversely arcuate in cross section the length thereof. The end of the handle 21 remote from plate-like element 10 has a central flat providing an anvil surface 23 having utility in application of the device 10 for the purposes described.

One application of the device 10 would be to fix a piercing, cutting or forming tool 30, having an expanded head end, including a flat 32 on its peripheral edge, in a predetermined relation to its retainer 34, the result of which is to precisely position the working end of the tool for alignment with the related die element in the die of which it forms a part. In this application, the bore 36 of the tool retainer will have a counterbore to accomodate the headed end of the tool in the end thereof remote from that end from which the working end of a tool is intended to project. The counterbore provides a recessed or inset shoulder 38 designed to seat the peripherally projected portion of the head end of the tool as the tool is inserted in its retainer. In the application described, the length of the plate-like element 10 will correspond to the depth of the counterbore, the innermost end of which is defined as to its limit by the shoulder 38.

In application of the tool 30, the flat 32 on its head end will be appropriately oriented so the working end of the tool is positioned as desired to properly align with the related die element of the die in which the tool is applied, as the peripheral projected edge portion of the head is seated to the shoulder 38. Under such circumstances, the flat 32 will face a portion of the peripheral wall of the counterbore in the tool retainer. A plate element 10 is then applied to fix the flat in its so established position.

In its initial application, the device 10 is applied to mount essentially perpendicular to the surface of the tool retainer 34 at the counterbore end of the tool bore with the thinned, tapered, lateral extremities of its leading edge 12 slightly inserted between the flat 32 and the facing wall portion of the counterbore. Under such circumstances, the outer corners of the side edges 16 of plate 10 immediately following the tapered portions are abutted to short extensions of a chord of the cross section of the counterbore on a line parallel to the flat 32. The arrangement is such that leading portions of the co-planar flat surface portions of the plate segments 18, between their tapered extremities, at the surface of the plate 10 opposite from that from which the section 17 projects will position to bear, on insertion, in abutting relation to the lateral extremities of the flat 32. With the device 10 so positioned, its trailing end will be tapped to induce its movement inwardly and axially of the counterbore. As this occurs, the outer corners of side edges 16 will bite into the end surface of the retainer, the plate being formed of a material harder than that of the retainer. Due to the spacing of the lead end of the projection 19 from the leading edge 12 of the device 10, there is no initial obstruction provided by the projection 19 or interference thereof with the commencement of the application of the device 10 in an easy manner. It should be noted that by virtue of the positioning of the device 10 and the depth of the section 17 that the outer convex surface portion of the section 17 will bear to a substantial extent on the central part of the arcuate extent of the peripheral wall surface of the counterbore which is in a direct facing relation to the flat 32.

Thus, on the application of the plate 10, the outer corners of the lateral extremities of the leading edge 12 bite into the retainer 34 as the plate segments 18 bear against and abut the lateral extremities of the flat 32 and the section 17 bears on the counterbore wall to establish the flat 32 in its required position. Continued tapping of the device 10 drives it inwardly of the counterbore and in the process the projection 19 gouges and wedges the material in the path thereof as the plate moves inwardly of the bore to dictate that the movement of the plate is in a substantially straight line path. This function is facilitated by the relatively sharp edges 7. The material displaced by the leading end of the tapered projection 19 in the process will flow about and to either side of this projection and in the positioning and seating of the plate this displaced material will be wedged to and about the sides 9 and surface 8 to resist its withdrawal of the plate in a manner believed obvious. As provided in the particular application described, the projection 20, which is an axial extension of the plate 10, bites into the shoulder 38 at the base of the counterbore as the leading edge 12 seats thereto. The construction and arrangement inhibits axial, rotative and lateral movement of the plate 10 and thereby insures that the working end of the tool fixed by the plate 10 will be maintained in its required relation to its related die element in use. It should be noted that the taper of the projection 19 lends a particular ease in application of the plate.

The device 10 can equally be applied in a simple bored hole and without the need for the utility or additional benefit of the projection 20. The single elongate projection 19 which bulges from the apex of the convex surface portion of the section 17 of the plate 10 serves admirably in such an application to maintain an alignment of the plate 10 on its axial insertion in a bore and assist in a biting engagement of the plate to the wall surface of the bore. In this case also the flow of material displaced by the projection 19 will serve to provide a self anchoring of the plate 10 in its application, at whatever position it is set. At the same time, the dimension of the plate 10 and its relation to the wall of the bore in which it is inserted as well as its relation to the cross sectional dimension of the shaft or shaft-like portion of an element placed in the bore, will be such to fix the element in its required position with reference to the bore.

As should be obvious, the device of the invention may also serve singly or in multiple form to be applied in an oversized bore to reduce its cross section so as to provide either a fixing or a bearing surface for a shaft or a shaft-like portion of a body. Such should be readily obvious from the foregoing.

The range of application of the key or bearing device of the invention is extensive. The device can be used most advantageously in connection with the fixing in place of components of a die in a stamping operation, whether the components are headed or headless. Furthermore, the device may be applied to a bearing component for a shaft mounting a wheel or wheels. See FIG. 7 in this respect. The device may serve likewise as either a fixing or a bearing device in any recess accommodating a shaft and or any portion of a shaft-like member, whether the shaft or shaft-like member is round, flat or of varied configuration in cross section. See the view of FIG. 8 wherein a shaft 50 having a flat 52 at one side of one end has this flatted end portion fixed in a bore centrally of a wheel-like object 54 by a plate insert 10 such as previously described. The application is made in an obvious manner and with results and function similar to that set forth with reference to the application shown in FIG. 5.

In any case, the arrangement of the construction of the embodiments of the invention as herein illustrated provides in the application thereof an interference between the projection 19 and the wall of the bore or recess in which the device is applied producing both an alignment and locking function thereof. At the same time, the leading ends of the lateral extremities of the plate segments 18 facilitate insertion to provide that only the outer corner portions of the side edges 16 bite into the rimming edge of the bore wall of the retainer accomodating the applied shaft-like element, together with the triangularly related leading end of projection 19. Thus, the application of plate 10 requires only a limited bite into opposite portions of a bore or recess wall, readily facilitated by the simple structure here provided. The addition of the lead anchor 20 can emphasize the containment of the device 10, where applied to suitably shouldered structure, in an obvious manner.

The simplicity of the preferred embodiment of the invention, as well as other embodiments obvious therefrom, insure the greatest economy in the fabrication thereof as well as ease and efficiency of their application. While there is interference as between parts in the application of the invention device, it is only to the extent necessary and not so contrived as to make it difficult for anyone to apply the invention device in a great number of applications.

Referring to FIG. 2 of the drawings, the utilization of the break-away handle in connection with the plate device 10 facilitates the handling thereof in application. The absence of the break-away handle, however, does not detract from the novelty of the plate 10 per se.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its form or modifications within the legitimate and valid scope of the appended claims.

The embodiments of the invention in which an exclusive property or privilege is claimed are defined as follows:

1. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading edge portion and a trailing portion, having regard to the direction of its application, said leading edge portion being provided with spaced anchoring means formed to engage wall portions of the bore, recess or cavity to which said plate device is applied.

2. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application and having a central portion of its longitudinal extent convexly contoured in a transverse sense, and anchor means projecting from said convexly contoured portion of said plate device which are longitudinally spaced and oriented in a direction substantially perpendicular to the leading edge of said plate device having regard for the direction of its application.

3. Apparatus as in claim 1 wherein said anchoring means includes a projection from said outer surface portion of said plate device the leading end of which, having regard to the direction of the insertion of the device, is rounded.

4. Apparatus as in claim 1 characterized in that said anchoring means on said leading edge portion of said device include a plurality thereof which are laterally spaced and each thereof is constructed and arranged to engage in and to displace portions of the wall of the bore, recess or cavity in which said device is applied.

5. Apparatus as in claim 1 characterized in that the lateral extremities of said device include thinned edge portions forming part of said spaced anchoring means and a central portion of said plate device, in a longitudinal sense includes a projection forming a further part of said anchoring means.

6. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means for engaging with a wall portion of the bore, recess or cavity to which said plate device is applied, said anchoring means comprising one thereof on and projected from the outer surface portion of said device the leading surface of which is in a location adjacent and spaced from the leading edge of said device, having regard to the direction of its application, and substantially centered with reference to the lateral extent of said plate device.

7. Apparatus as in claim 6 characterized by said anchoring means including another anchoring means projected from said leading edge of said device.

8. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means on a leading portion thereof for engaging with a wall portion of the bore, recess or cavity to which said plate device is applied, said anchoring means including two anchoring means, one aligned with and spaced from the other and centered between the lateral extremities of said plate device.

9. Apparatus as in claim 8 wherein one of said two anchoring means is fixed to and projected from the leading edge of said plate device, centered between its lateral extremities, and said one anchoring means is a single tooth-like projection the leading end of which is pointed.

10. Apparatus as in claim 9 wherein the other of said two anchoring means provides a single narrow elongate bulge on said outer surface portion which is laterally centered.

11. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means for engaging with a wall portion of the bore, recess or cavity to which said plate device is applied, at least a portion of which is substantially centered with reference to the lateral extent of said plate device, at least a portion of said outer surface portion of said plate device being formed as a longitudinally extending segment of a cylindrical surface and said anchoring means including a single projection on said outer surface portion and a single projection from the leading edge of said plate device.

12. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means for engaging with a wall portion of the bore, recess or cavity to which said plate device is applied provided on said outer surface portion of said plate device spaced inwardly of its lateral extremities and form its leading edge, having regard for the direction of its application.

13. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means for engaging with a wall portion of the bore, recess or cavity to which said plate device is applied, including anchoring means on said outer surface portion on said plate device spaced inwardly of its lateral extremities and projected and extending in a sense longitudinally of said plate device, and in profile said anchoring means being tapered and constructed and arranged to have its greatest depth at the end thereof reaching towards the trailing portion of said plate device and its least depth at the end thereof reaching towards said leading portion of said plate device.

14. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means for engaging with a wall portion of the bore, recess or cavity to which said plate device is applied including anchoring means substantially centered with reference the lateral extent of said plate device, said plate device including a laterally centered portion of its longitudinal extent which is arcuate in cross section and flanked by integral plate segments the remote lateral extremities of which define the lateral extremities of said plate device, said lateral extremities of said plate device having thinned portions at their leading edge, having regard to the direction of application of said device, facilitating the application of said device in a bore, recess or cavity.

15. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, said plate device including a laterally centered portion of its longitudinal extent which is arcuate in cross section and flanked by integral plate segments the remote lateral extremities of which define the lateral extremities of said plate device, said lateral extremities of said plate device having thinned portions at their leading edge, having regard to the direction of application of said device, facilitating the application of said device in a bore, recess or cavity.

16. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, and anchoring means on a leading portion thereof for engaging with a wall portion of the bore, recess or cavity to which said plate device is applied, said anchoring means being substantially centered with reference to the lateral extent of said plate device, said plate device including laterally projecting portions, the leading portions of which are thinned at their remote corners by inclination of one surface thereof relative the opposed surface, the inclinations so provided being towards said remote corners.

17. Apparatus for insertion in a bore, recess or cavity to provide a fixing or bearing surface for a portion of a shaft or a shaft-like element comprising a plate device including an inner surface portion which disposes most adjacent the central axis of the bore, recess or cavity and an outer surface portion arranged to apply, at least in part, to the wall of the bore, recess or cavity, said device having a leading portion and a trailing portion, having regard to the direction of its application, anchoring means provided on and projected from said leading portion of said plate device, for engaging with a wall portion of the bore, recess or cavity to which said plate device is applied, said anchoring means being substantially centered with reference to the lateral extent of said plate device and said plate device including laterally projecting portions the leading portions of which are thinned at their remote corners by inclination of one surface thereof relative the opposed surface, the inclinations so provided being toward said remote corners.

* * * * *

UNITED STATES PATENT AND TRADEMARK OFFICE
CERTIFICATE OF CORRECTION

PATENT NO. : 4,334,714

DATED : JUNE 15, 1982

INVENTOR(S) : Robert J. Gargrave

It is certified that error appears in the above—identified patent and that said Letters Patent is hereby corrected as shown below:

Col. 5, line 44, "to" is corrected to read -- as --.

Col. 8, line 30 (Claim 12, line 14), "form" is corrected to read -- from --;

Col. 8, line 64 (Claim 14, line 13) -- to -- is inserted following "reference".

Signed and Sealed this

Thirtieth Day of November 1982

[SEAL]

Attest:

Attesting Officer

GERALD J. MOSSINGHOFF

Commissioner of Patents and Trademarks